(12) United States Patent
Tashiro (10) Patent No.: US 7,906,021 B2
(45) Date of Patent: Mar. 15, 2011

(54) CONTAMINATED FLUID RECOVERY APPARATUS

(75) Inventor: Minoru Tashiro, Toyko (JP)

(73) Assignee: Bunri Incorporation, Miyazaki (JP)

( * ) Notice: Subject to any disclaimer, the term of this patent is extended or adjusted under 35 U.S.C. 154(b) by 0 days.

(21) Appl. No.: 12/382,642

(22) Filed: Mar. 20, 2009

(65) Prior Publication Data

US 2009/0184040 A1 Jul. 23, 2009

Related U.S. Application Data (63) Continuation of application No. PCT/JP2008/061257, filed on Jun. 19, 2008.

(30) Foreign Application Priority Data

Jun. 21, 2007 (JP) .................................. 2007-164133

(51) Int. Cl.
*B01D 21/18* (2006.01)
*B24B 55/03* (2006.01)
(52) U.S. Cl. ................ 210/223; 210/167.03; 210/172.2; 210/298; 210/396; 210/526
(58) Field of Classification Search .................. 210/222, 210/223, 695, 167.03, 172.2, 171, 298, 396, 210/525, 526
See application file for complete search history.

(56) References Cited

U.S. PATENT DOCUMENTS

| | | | | |
|---|---|---|---|---|
| 2,876,904 A | * | 3/1959 | Fowler | 210/298 |
| 3,522,883 A | * | 8/1970 | Steckhan | 210/222 |
| 4,296,865 A | * | 10/1981 | Spodig | 209/216 |
| 4,440,642 A | * | 4/1984 | Frese et al. | 210/387 |
| 5,026,487 A | * | 6/1991 | Abdulmassih | 210/791 |
| 5,167,839 A | * | 12/1992 | Widmer et al. | 210/784 |
| 2006/0049112 A1 | * | 3/2006 | Moore | 210/695 |

FOREIGN PATENT DOCUMENTS

| | | | |
|---|---|---|---|
| EP | 1243559 A2 | * | 9/2002 |
| JP | 017154/1984 | | 8/1985 |
| JP | 017155/1984 | | 8/1985 |
| JP | 067232/1985 | | 11/1986 |
| JP | 043902/1990 | | 1/1992 |

(Continued)

OTHER PUBLICATIONS

Machine translation of JP 2001-179124, pp. 1-14.*

(Continued)

*Primary Examiner* — Tony G Soohoo
*Assistant Examiner* — David C Mellon
(74) *Attorney, Agent, or Firm* — Bacon & Thomas, PLLC (57) ABSTRACT

A contaminated fluid recovery apparatus includes a dirty tank, a conveyor, and a drum-shaped filter unit. Inlet ports of the drum-shaped filter unit open along an axis of a magnet drum. The conveyor scrapes out an object for removal settled on a bottom portion of the dirty tank toward an exit section. The conveyor includes a lower portion which moves along the bottom portion and an upper portion which passes over the lower portion. The magnet drum is located horizontally between the lower portion and the upper portion of the conveyor so that its axis is perpendicular to a direction of travel of the conveyor. The magnet drum is driven by a chain of the conveyor.

4 Claims, 5 Drawing Sheets

FOREIGN PATENT DOCUMENTS

| | | |
|---|---|---|
| JP | 04-176305 | 6/1992 |
| JP | 08-052379 | 2/1996 |
| JP | 09-000824 | 1/1997 |
| JP | 2001-179124 | 7/2001 |
| JP | 2001-179571 | 7/2001 |
| JP | 2001-219010 | 8/2001 |
| JP | 2003-200008 | 7/2003 |

OTHER PUBLICATIONS

Machine translation of JP 8-52379, pp. 1-10.*

PCT Notification of Transmittal of the International Preliminary Report on Patentability (Chapter I or Chapter II of the Patent Cooperation Treaty) dated Jan. 21, 2010 for International Application No. PCT/JP2008/061257.

* cited by examiner

CONTAMINATED FLUID RECOVERY APPARATUS

CROSS REFERENCE TO RELATED APPLICATIONS

This is a Continuation Application of PCT Application No. PCT/JP2008/061257, filed Jun. 19, 2008, which was published under PCT Article 21(2) in Japanese.

This application is based upon and claims the benefit of priority from prior Japanese Patent Application No. 2007-164133, filed Jun. 21, 2007, the entire contents of which are incorporated herein by reference.

BACKGROUND OF THE INVENTION

1. Field of the Invention

The present invention relates to a contaminated fluid recovery apparatus for decontaminating a contaminated fluid containing, for example, chips and fine sludge.

2. Description of the Related Art

A machine tool for machining, such as cutting, grinding, etc., uses a fluid such as a coolant for cooling a workpiece. This fluid contains foreign matter, such as chips produced by machining, fine sludge, etc. A contaminated fluid recovery apparatus is used to reuse the contaminated fluid that contains the chips, sludge, etc. The contaminated fluid recovery apparatus removes the chips, sludge, etc., from the contaminated fluid.

The inventors hereof have long been investigating and developing contaminated fluid recovery apparatuses. In consequence, they have succeeded in developing a high-performance contaminated fluid recovery apparatus that combines a conveyor and a filter provided with a magnet drum, as described in, for example, Jpn. Pat. Appln. KOKAI Publication No. 2005-66820. This contaminated fluid recovery apparatus includes the magnet drum that is located at an overflow section near the liquid surface of a dirty tank. Fine magnetic sludge in a contaminated fluid is attracted to the outer peripheral surface of the magnet drum. The conveyor is provided with a plurality of scrapers. The scrapers scrape out relatively large chips and the like settled at the bottom of the dirty tank toward an exit section outside the dirty tank.

The contaminated fluid recovery apparatus is located so that a rotating shaft (axis) of a filter drum member is parallel to the direction of travel of the conveyor. Therefore, it requires two types of drive systems, a mechanism for driving the conveyor and a mechanism for rotating the filter drum. Thus, there is a problem that the drive systems are complicated and the contaminated fluid recovery apparatus becomes larger.

In the conventional contaminated fluid recovery apparatus, moreover, the filter drum member is located parallel to the direction of travel of the conveyor. Thus, an inlet port of the drum-shaped filter unit has a shape transversely elongated in the direction of travel of the conveyor. A contaminated fluid supply port through which the contaminated fluid to be decontaminated is fed into the dirty tank is disposed over the dirty tank.

If the inlet port is transversely elongated in the direction of travel of the conveyor, one end of the inlet port is situated nearer to the contaminated fluid supply port than the other end in a case where a sufficient space cannot be secured in the direction of travel of the conveyor. Thus, relatively large chips that are fed into the dirty tank through the contaminated fluid supply port get into the inlet port, thereby increasing the load on the filter drum member.

BRIEF SUMMARY OF THE INVENTION

The present invention provides a contaminated fluid recovery apparatus in which a drive system for a drum-shaped filter unit can be simplified and relatively large chips in a fluid supplied to a dirty tank can be kept from flowing into the drum-shaped filter unit.

A contaminated fluid recovery apparatus of the present invention comprises a dirty tank which contains a contaminated fluid, a contaminated fluid supply port through which the contaminated fluid to be decontaminated is discharged into the dirty tank, an exit section located in a position higher than a liquid surface of the dirty tank, a conveyor including a scraper and a chain for scraping out an object for removal settled on a bottom portion of the dirty tank toward the exit section and including a lower portion which moves from the bottom portion of the dirty tank toward the exit section and an upper portion which passes over the lower portion and approaches a starting end of the lower portion, and a drum-shaped filter unit including a filter drum member disposed in the dirty tank and having an inlet port through which the contaminated fluid in the dirty tank is caused to flow toward the filter drum member. The inlet port opens along an axis of the filter drum member, the filter drum member is located in a horizontal attitude between the lower portion and the upper portion of the conveyor such that the axis is perpendicular to a direction of travel of the conveyor, and the apparatus includes a drive system which transmits a motion of the chain of the conveyor to the filter drum member, thereby rotating the drum member in association with the conveyor.

According to the present invention, the filter drum member located in the dirty tank can be rotated by means of the chain of the conveyor, so that the drive system can be simplified, and the contaminated fluid recovery apparatus can be constructed compactly. Further, the filter drum member is located in such a horizontal attitude as to be perpendicular to the direction of travel of the conveyor, and the inlet port of the drum-shaped filter unit opens along the filter drum member. Therefore, the inlet port of the drum-shaped filter unit can be kept sufficiently distant from the contaminated fluid supply port throughout its length, so that relatively large chips can be kept from getting into the inlet port of the drum-shaped filter unit.

An example of the filter drum member is a magnet drum, and the inlet port should preferably be directed away from the contaminated fluid supply port. Further, an idler sprocket for transmitting the motion of the chain of the conveyor to the filter drum member, thereby rotating the drum member, may be located between the chain of the conveyor and a driven section of the filter drum member. Depending on the specifications of the dirty tank, moreover, the inlet port may be directed toward the contaminated fluid supply port. Furthermore, the motion of the chain of the conveyor may be transmitted to the filter drum member without using the idler sprocket.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A contaminated fluid recovery apparatus provided with a drum-shaped filter unit according to one embodiment of the present invention will now be described with reference to FIGS. 1 to 4.

Figure 1:
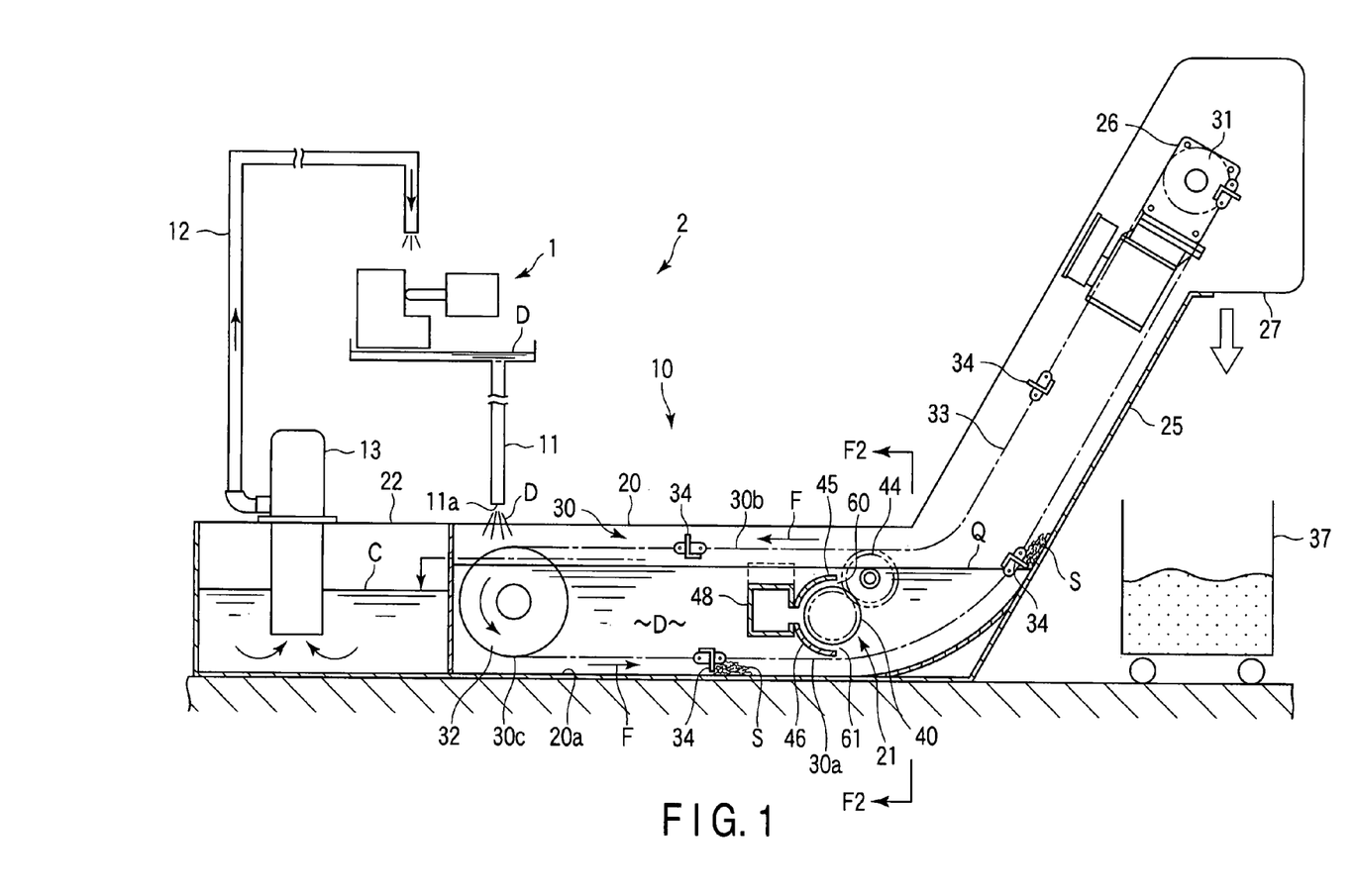
FIG. 1 is a sectional view typically showing a fluid circulation system provided with a contaminated fluid recovery apparatus according to one embodiment of the present invention.

FIG. 1 shows a fluid circulation system 2. The fluid circulation system 2 is used to remove foreign matter from a coolant used in a machine tool 1, such as a machining center, so that the coolant can be reused. The contaminated coolant discharged from the machine tool 1 is an example of a contaminated fluid D. The contaminated fluid D contains, for example, chips of an aluminum alloy or iron-based metal produced by cutting or the like, fine particles of a nonmetal, such as carbon, etc.

The fluid circulation system 2 includes a contaminated fluid recovery apparatus 10, a contaminated fluid supply pipe 11, a cleaned fluid supply pipe 12, a pump 13, etc. The contaminated fluid supply pipe 11 supplies the contaminated fluid D from the machine tool 1 to the contaminated fluid recovery apparatus 10. The cleaned fluid supply pipe 12 supplies a cleaned fluid C decontaminated by the contaminated fluid recovery apparatus 10 to the machine tool 1.

The contaminated fluid recovery apparatus 10 includes a dirty tank 20, a drum-shaped filter unit 21, and a clean tank 22. The dirty tank 20 contains the contaminated fluid D. The drum-shaped filter unit 21 is set within the dirty tank 20. The clean tank 22 is located side by side with the dirty tank 20. A contaminated fluid supply port 11a is located above one end (left-hand side in FIG. 1) of the dirty tank 20.

On the other end (right-hand side in FIG. 1) of the dirty tank 20, a scooping section 25 is formed extending obliquely upward. A rotary drive mechanism 26 and an exit section 27 are provided over the scooping section 25. The exit section 27 is in a position higher than a liquid surface Q of the dirty tank 20.

A conveyor 30 is provided ranging from a bottom portion 20a of the dirty tank 20 to the scooping section 25. The conveyor 30 includes an upper sprocket 31, a lower sprocket 32, chains 33 as an example of wound transmission media, and a plurality of scrapers 34. The chains 33 endlessly travel between the upper sprocket 31 and the lower sprocket 32. The scrapers 34 are attached to the chains 33. The chains 33 are moved in a direction indicated by arrow F in FIG. 1 by the rotary drive mechanism 26 that includes a motor as a drive source. The movement of the chains 33 is guided by guide members 35 (shown in FIG. 2). The guide members 35 are provided on the bottom portion 20a of the dirty tank 20.

The scrapers 34 are arranged at predetermined intervals along the length of the chains 33. By means of these scrapers 34, objects to be removed, such as chips, sludge, etc., settled on the bottom portion 20a of the dirty tank 20, are carried out through the scooping section 25 into the exit section 27. The objects for removal having reached the exit section 27 fall from the exit section 27 into a collection box 37.

The conveyor 30 includes a lower portion (forward path portion) 30a and an upper portion (backward path portion) 30b. The lower portion 30a of the conveyor 30 moves along the bottom portion 20a of the dirty tank 20 toward the exit section 27. The upper portion 30b of the conveyor 30 moves from the exit section 27 toward the sprocket 32, passing over the lower portion 30a. The sprocket 32 is a starting end 30c of the lower portion 30a.

Figure 2:
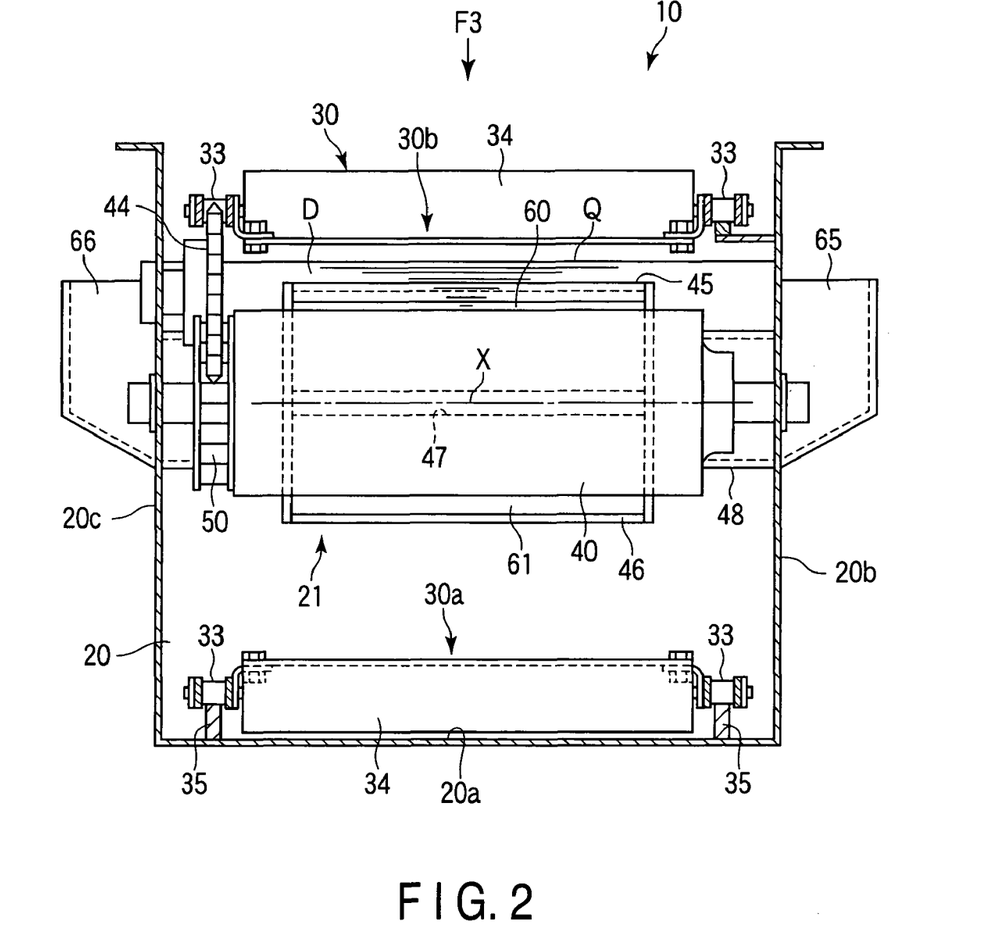
FIG. 2 is a sectional view of the contaminated fluid recovery apparatus taken along line F2-F2 in FIG. 1.
Figure 3:
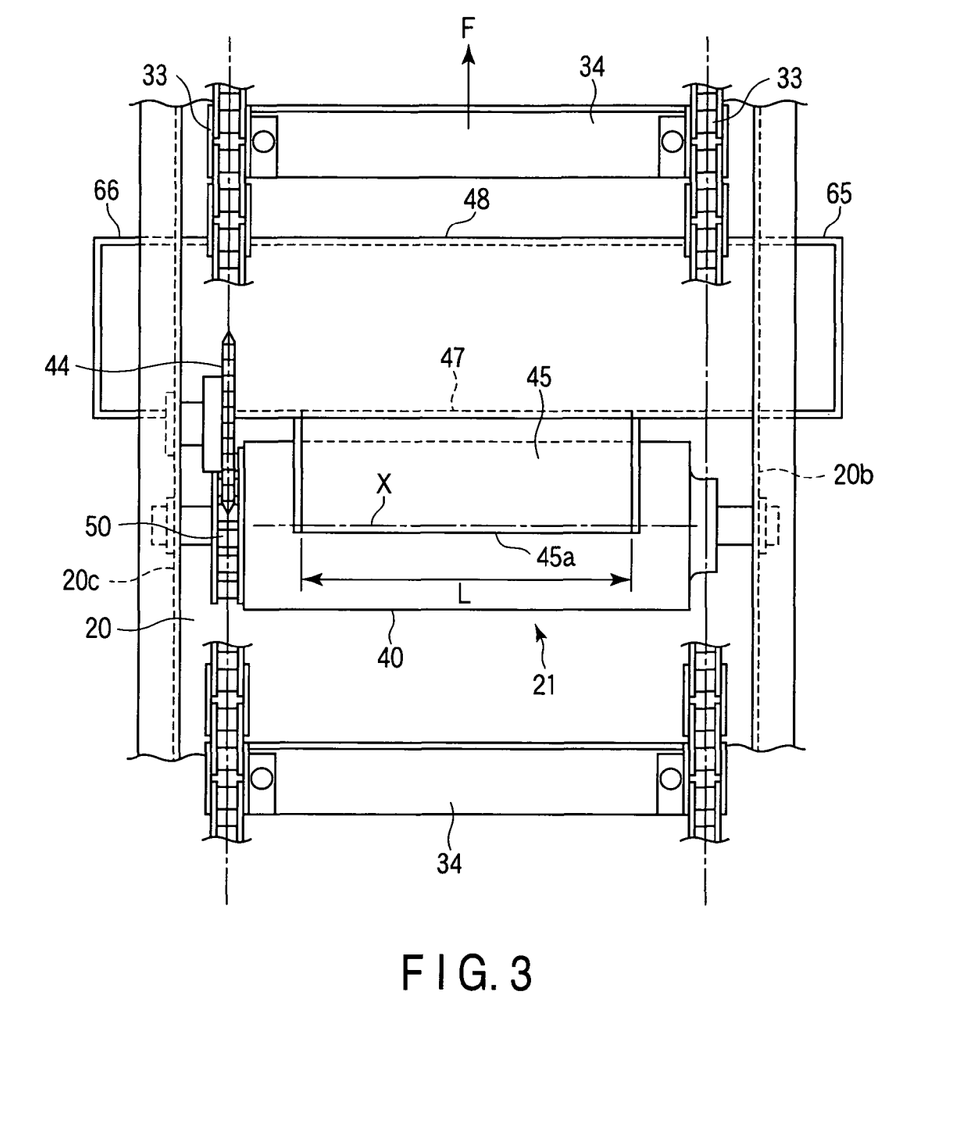
FIG. 3 is a plan view of a part of the contaminated fluid recovery apparatus taken in the direction of arrow F3 in FIG. 2.

The drum-shaped filter unit 21 is located within the dirty tank 20. As shown in FIGS. 2 and 3, an example of the drum-shaped filter unit 21 is provided with a cylindrical magnet drum 40, magnet 41 (shown in FIG. 4), idler sprocket 44, upper fluid guide plate 45, lower fluid guide plate 46, and fluid collection pipe 48. The magnet drum 40 is immersed in the contaminated fluid D. The magnet 41 is located inside the magnet drum 40. The idler sprocket 44 is rotated by the chains 33 of the conveyor 30. A slit 47 is formed in the fluid collection pipe 48. The magnet drum 40 is an example of a filter drum member.

The magnet drum 40 is a cylindrical body made of a non-magnetic material, such as stainless steel, or a weakly magnetic material. The strong magnet 41 is located inside the magnet drum 40. A gap is formed between the outer peripheral surface of the magnet 41 and the inner peripheral surface of the magnet drum 40. The magnet 41 is fixed to the dirty tank 20 by means of a frame (not shown).

Figure 4:
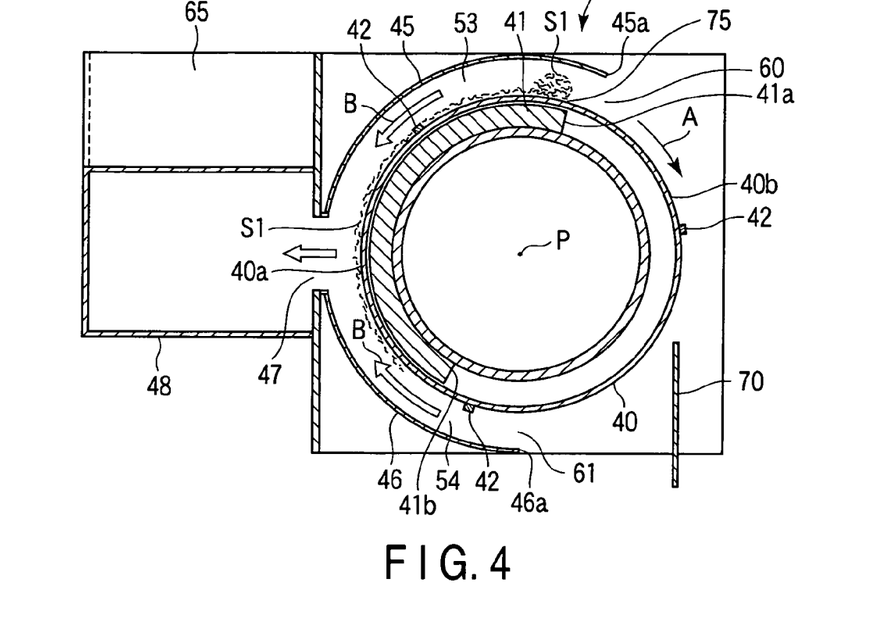
FIG. 4 is a sectional view of a drum-shaped filter unit used in the contaminated fluid recovery apparatus.

As shown in FIG. 4, the magnet 41 has a distal end 41a and a rear end 41b. The distal end 41a is situated on the front side with respect to a rotation direction A of the magnet drum 40. The rear end 41b is situated on the rear side with respect to the rotation direction A of the magnet drum 40. The magnet 41 is located in a circular arc (substantially C-shaped in radial cross section) along the inner peripheral surface of the magnet drum 40. The distal end 41a of the magnet 41 is situated near the upper part of the magnet drum 40. The rear end 41b of the magnet 41 is in a position lower than the distal end 41a of the magnet 41. The rear end 41b is situated near the lower part of the magnet drum 40. This magnet 41 is located along fluid channels 53 and 54, which will be described later.

The magnet drum 40 has an axis X. The magnet drum 40 can rotate relatively to the magnet 41 in the direction of arrow A (shown in FIG. 4) around the axis X. That region of the entire circumference of the magnet drum 40 which faces the magnet 41 forms a magnetic field region 40a. The magnetic field region 40a is under the influence of the magnetic field of the magnet 41. That region which does not face the magnet 41 forms a nonmagnetic field region 40b. The nonmagnetic field region 40b is not under the influence of the magnetic field of the magnet 41.

As shown in FIGS. 2 and 3, the magnet drum 40 is located in a horizontal attitude such that its axis X is perpendicular to a direction of travel F of the conveyor 30. The axis X is the center of rotation of the magnet drum 40. In addition, the magnet drum 40 is located between the lower portion 30a and the upper portion 30b of the conveyor 30.

A plurality of ridge parts 42 are provided on the outer peripheral surface of the magnet drum 40. Each ridge part 42 protrudes radially of the magnet drum 40. These ridge parts 42 are disposed in a plurality of positions (e.g., three positions at regular circumferential intervals) with respect to the rotation direction A of the magnet drum 40. Each ridge part 42 extends in the direction of the axis X of the magnet drum 40, and each ridge part 42 substantially covers the overall length of the magnet drum 40.

An example of the ridge part 42 is formed of a square bar of which each side is 3 to 5 mm long. The ridge parts 42 may be formed of materials of various shapes, such as round bars or flat plates, as well as square bars. These ridge parts 42 are formed of a nonmagnetic material or a weakly magnetic material lest they be magnetized by the magnet 41. The size and number of the ridge parts 42 are not limited to those of the embodiment described above. In short, the size and number of the ridge parts 42 are selected depending on magnetic sludge that is captured by the magnet drum 40.

A driven section 50 is disposed on a side portion of the magnet drum 40. The driven section 50 is in engagement with the idler sprocket 44. If the chains 33 of the conveyor 30 move in the direction of arrow F, the idler sprocket 44 rotates, and also, the magnet drum 40 rotates. The idler sprocket 44 and the driven section 50 of the magnet drum 40 constitute a drive system for converting the movement of the chains 33 in the direction of arrow F into a rotary motion of the magnet drum 40.

As shown in FIG. 4, the fluid guide plates 45 and 46 are curved in a circular arc along the outer peripheral surface of the magnet drum 40. The upper fluid channel 53 is formed between the upper fluid guide plate 45 and the magnet drum 40. The upper fluid channel 53 extends along the outer peripheral surface of the magnet drum 40. The lower fluid channel 54 is formed between the lower fluid guide plate 46 and the magnet drum 40. The lower fluid channel 54 extends along the outer peripheral surface of the magnet drum 40. In FIG. 4, arrow B indicates a direction in which the fluid flows.

An inlet port 60 opens between a distal end portion 45a of the upper fluid guide plate 45 and the magnet drum 40. An inlet port 61 opens between a distal end portion 46a of the lower fluid guide plate 46 and the magnet drum 40. These inlet ports 60 and 61 extend transversely relative to the dirty tank 20 along the axis X of the magnet drum 40. The transverse direction of the dirty tank 20 is a horizontal direction perpendicular to the direction of travel F of the conveyor 30. As shown in FIG. 1, moreover, these inlet ports 60 and 61 are directed away from the contaminated fluid supply port 11a. Therefore, the inlet ports 60 and 61 open in positions sufficiently distant from the contaminated fluid supply port 11a, covering an overall transverse distance L (shown in FIG. 3).

Thus, the inlet ports 60 and 61 open transversely relative to the dirty tank 20, and, in addition, the inlet ports 60 and 61 are directed away from the contaminated fluid supply port 11a. Accordingly, relatively large chips in the fluid D that are deposited in the dirty tank 20 through the contaminated fluid supply port 11a cannot be moved to the inlet ports 60 and 61. As shown in FIG. 4, the distal end portion 45a of the upper fluid guide plate 45 may be formed to extend forward from just above a center P of the magnet drum 40. If this is done, it becomes more difficult for sludge suspending in the contaminated fluid D to get into the inlet port 60.

As shown in FIGS. 2 and 3, the opposite end portions of the fluid collection pipe 48 project individually outward from sidewalls 20b and 20c of the dirty tank 20, thereby forming overflow tanks 65 and 66. Alternatively, only one of the overflow tanks 65 and 66 may be provided. If the liquid surface Q of the dirty tank 20 rises above a predetermined level, the cleaned fluid C overflows the respective upper ends of the overflow tanks 65 and 66. The overflowed cleaned fluid C flows out into the clean tank 22. Thus, the liquid surface Q of the dirty tank 20 can be kept at a constant level.

Figure 5:
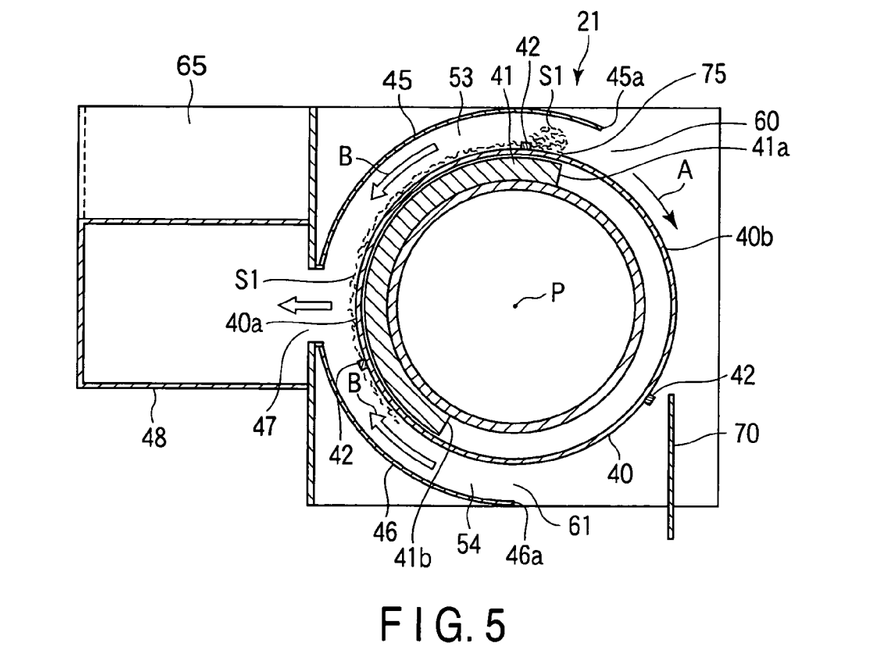
FIG. 5 is a sectional view showing a state after a magnet drum of the drum-shaped filter unit is rotated in the direction of arrow A.
Figure 6:
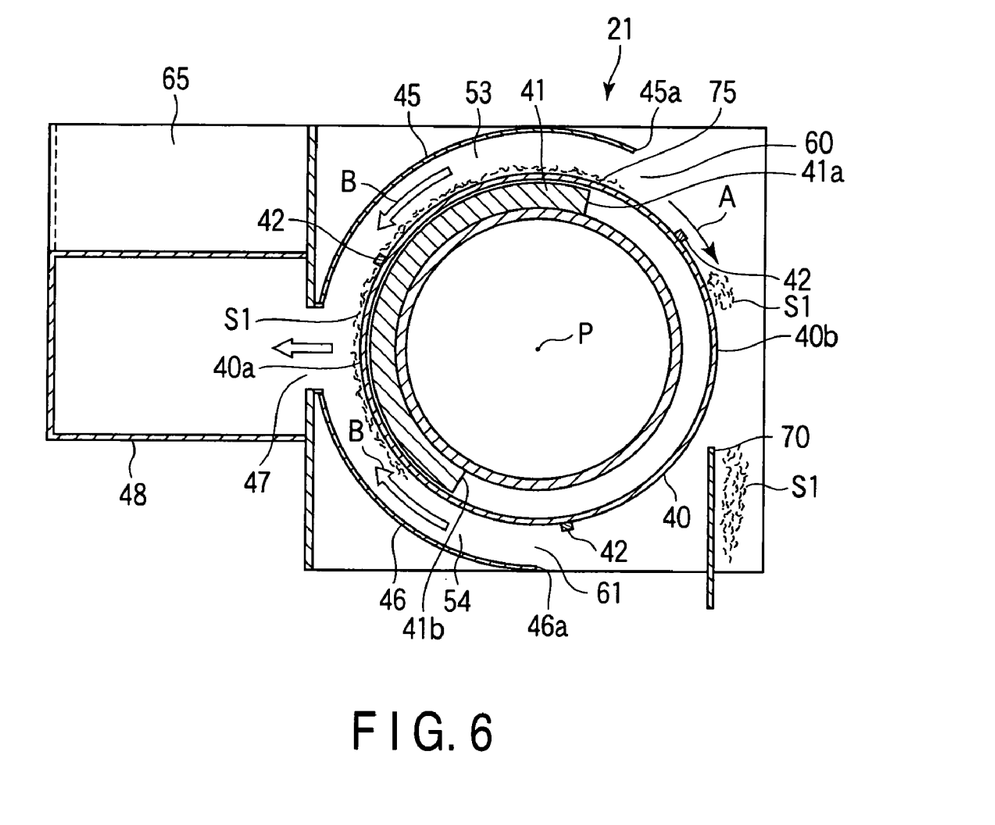
FIG. 6 is a sectional view showing a state after the magnet drum is further rotated in the direction of arrow A.

As shown in FIGS. 4 to 6, a guard plate 70 is disposed opposite the inlet port 61. The guard plate 70 is located in a position such that objects for removal S1 (shown in FIG. 6) separated from the nonmagnetic field region 40b of the magnet drum 40 and falling away can be prevented from being directed to the inlet port 61.

A scraping member (not shown) may be disposed near the magnet drum 40 instead of providing the ridge parts 42 and the guard plate 70. The sludge adhering to the outer peripheral surface of the magnet drum 40 can be scraped off by bringing the distal end of the scraping member into contact with the outer peripheral surface of the magnet drum 40.

The following is a description of the function of the contaminated fluid recovery apparatus 10 constructed in this manner.

The contaminated fluid D discharged from the machine tool 1 is supplied to the dirty tank 20 through the contaminated fluid supply port 11a. Relatively large, heavy objects for removal in the contaminated fluid D settle on the bottom portion 20a of the dirty tank 20 in a short time in the vicinity of the contaminated fluid supply port 11a. The objects for removal settled on the bottom portion 20a are scraped out along the scooping section 25, from the bottom portion 20a of the dirty tank 20 to the exit section 27, by the scraper 34 of the conveyor 30. The objects for removal having reached the exit section 27 fall into the collection box 37.

The contaminated fluid D in the dirty tank 20 flows into the space inside the fluid guide plates 45 and 46 through the inlet ports 60 and 61 of the drum-shaped filter unit 21. Then, the contaminated fluid D advances toward the fluid collection pipe 48 through the fluid channels 53 and 54 and the slit 47. As this is done, the fine magnetic sludge suspending in the contaminated fluid D is adsorbed to the outer peripheral surface of the magnet drum 40 by the magnetic force of the magnet 41. The magnet drum 40 is entirely immersed in the contaminated fluid D. Accordingly, the top side of the magnet drum 40 can also be used effectively as an adsorption surface for sludge.

The cleaned fluid C decontaminated by the drum-shaped filter unit 21 flows into the overflow tanks 65 and 66 through the slit 47 and the fluid collection pipe 48. Then, it overflows the respective upper ends of the overflow tanks 65 and 66 and flows into the clean tank 22. The cleaned fluid C guided into the clean tank 22 is drawn by the pump 13 and supplied again to the machine tool 1 through the cleaned fluid supply pipe 12.

As shown in FIG. 4, the objects for removal S1 of a magnetic material captured by the magnetic field region 40a (that faces the magnet 41) of the magnet drum 40 move together with the magnet drum 40 in the rotation direction A of the magnet drum 40. In the vicinity of the distal end 41a of the magnet 41, the objects for removal S1 are adsorbed to the magnetic field region 40a of the magnet drum 40 by the strong magnetic force of the strong magnet 41, so that the objects for removal S1 cannot move toward the nonmagnetic field region 40b. Thus, the objects for removal S1 are gradually deposited near a boundary section 75 between the magnetic field region 40a and the nonmagnetic field region 40b.

As shown in FIG. 5, the magnet drum 40 further rotates in the direction of arrow A, and the ridge part 42 moves close to the boundary section 75. Thereupon, the objects for removal S1 having been deposited near the boundary section 75 are forced out toward the nonmagnetic field region 40b by the ridge part 42. When the extruded objects for removal S1 move to a position where they are not influenced by the magnetic force of the magnet 41, the objects for removal S1 naturally separate from the surface of the magnet drum 40.

The objects for removal S1 having been standing near the boundary section 75 are magnetized and attracted to one another, so that they are aggregate and liable to settle in the fluid. As shown in FIG. 6, therefore, the objects for removal S1 pushed out into the nonmagnetic field region 40b by the ridge part 42 separate from the surface of the magnet drum 40 and fall in the fluid D in the dirty tank 20. The guard plate 70 should preferably be provided near the inlet port 61 lest the objects for removal S1 having thus fallen advance again toward the inlet port 61.

The objects for removal S1 separated from the magnet drum 40 advance toward the lower portion 30a of the conveyor 30 (shown in FIG. 1) and the bottom portion 20a of the dirty tank 20. Accordingly, the objects for removal S1 falling from the magnet drum 40 can be prevented from striking the upper portion 30b of the conveyor 30 and rediffusing into the fluid D. The objects for removal S1 thus dropped toward the lower portion 30a of the conveyor 30 are scraped out together with the chips and the like toward the exit section 27 by the scraper 34 of the conveyor 30.

The objects for removal S, including the chips, sludge, etc., moving together with the scraper 34 of the conveyor 30 ascend together with the scraper 34 through the liquid surface Q of the dirty tank 20 and advance toward the exit section 27. As the objects for removal S pass through the liquid surface Q, fine particles floating on the liquid surface Q adhere to the objects for removal S moving together with the scraper 34 and are delivered together with the objects for removal S to the exit section 27.

If the operation of the machine tool 1 is suspended so that the contaminated fluid recovery apparatus 10 is stopped at night or on a holiday, the fine particles having so far been floating on the liquid surface Q of the dirty tank 20 gradually settle down in the contaminated fluid D with the passage of time. The settled fine particles adhere to the objects for removal S, including the chips and the like deposited on the bottom portion 20a of the dirty tank 20.

The operation of the machine tool 1 is restarted, and the contaminated fluid recovery apparatus 10 is driven. Thereupon, the scrapers 34 of the conveyor 30 move again. The objects for removal S including the chips and the like, having so far been deposited on the bottom portion 20a of the dirty tank 20, are scraped out toward the exit section 27 by the scrapers 34. Fine particles and ultrafine particles settled in the dirty tank 20 adhere to these objects for removal S. Thus, even the ultrafine particles in the contaminated fluid D are thoroughly removed, so that the cleaned fluid C with very high purity can be obtained.

In the drum-shaped filter unit 21 of the present embodiment, the magnet drum 40 is rotated by using the motion of the chains 33 of the conveyor 30. Thus, a drive system for rotating the magnet drum 40 is so simple that the contaminated fluid recovery apparatus 10 with the drum-shaped filter unit 21 can be constructed compactly.

In addition, the magnet drum 40 is located horizontally between the lower portion 30a and the upper portion 30b of the conveyor 30. Specifically, the axis X of the magnet drum 40 is parallel to the respective axes of the sprockets 31 and 32 of the conveyor 30. Thus, the internal space of the dirty tank 20 can be effectively used, so that the height and length of the dirty tank 20 can be shortened.

The inlet ports 60 and 61 of the drum-shaped filter unit 21 of the present embodiment open opposite from the contaminated fluid supply port 11a. Further, the inlet ports 60 and 61 extend transversely relative to the dirty tank 20 (direction perpendicular to the direction of travel of the conveyor 30). Accordingly, the inlet ports 60 and 61 can be sufficiently separated from the contaminated fluid supply port 11a throughout their length.

Relatively large, heavy chips supplied to the dirty tank 20 through the contaminated fluid supply port 11a settle on the bottom portion 20a of the dirty tank 20 in the vicinity of the contaminated fluid supply port 11a. In the present embodiment, the inlet ports 60 and 61 are situated at distances from contaminated fluid supply port 11a, and besides, are directed away from the contaminated fluid supply port 11a. Accordingly, the relatively large chips in the contaminated fluid D can be kept from flowing into the inlet ports 60 and 61, so that the load on the magnet drum 40 is reduced.

In the foregoing embodiment, moreover, the objects for removal adhering to the magnet drum 40 can be separated from the magnet drum 40 by means of the ridge parts 42 that are rotating together with the magnet drum 40, instead of using the conventional contact scraping member. Accordingly, there are no parts in contact the magnet drum 40, such as those of the conventional scraping member. Thus, the apparatus includes no parts that wear, so that it has an advantage of being maintenance-free in operation.

A contaminated fluid recovery apparatus of the present invention can also decontaminate some fluids other than a coolant. It is to be understood that, in carrying out the present invention, the components of the contaminated fluid recovery apparatus, including the conveyor, drum-shaped filter unit, etc., as well as the dirty tank, may be embodied in modified forms without departing from the spirit of the invention. Further, the filter drum member is not limited to the magnet drum, and a filter drum member in another form may be used instead.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contaminated fluid recovery apparatus comprising:
    a dirty tank which contains a contaminated fluid;
    a contaminated fluid supply port through which the contaminated fluid to be decontaminated is discharged into the dirty tank;
    an exit section located in a position higher than a liquid surface of the dirty tank;
    a conveyor including a scraper and a chain for scraping out magnetic objects settled on a bottom portion of the dirty tank toward the exit section and including a lower portion which moves from the bottom portion of the dirty tank toward the exit section and an upper portion which passes over the lower portion and approaches a starting end of the lower portion; and
    a drum-shaped filter unit including a filter drum member disposed in the dirty tank,
    the filter drum member being located between the lower portion and the upper portion of the conveyor such that an axis extends in a horizontal direction and the axis is perpendicular to a direction of travel of the conveyor, and
    the apparatus including a drive system which transmits a motion of the chain of the conveyor to the filter drum member, thereby rotating the drum member in association with the conveyor, wherein the filter drum member is a magnet drum comprising a cylindrical outer peripheral surface, an upper fluid guide plate disposed along an upper region of the magnet drum, a lower fluid guide plate disposed along a lower region of the magnet drum, an upper fluid channel defined between the upper fluid guide plate and the magnet drum, the upper fluid channel includes an upper inlet port located at an upper end thereof and extending along the axis (X) of the magnet drum, the contaminated fluid flows along the upper fluid guide plate downward from the upper inlet port toward a lower end of the upper fluid guide plate, a lower fluid channel defined between the lower fluid guide plate and the magnet drum, the lower fluid channel includes an lower inlet port located at an lower end thereof and extending along the axis, the contaminated fluid flows along the lower fluid guide plate upward from the lower inlet port toward an upper end of the lower fluid guide plate, an outlet port located at a confluence of the upper fluid channel and the lower fluid channel, the outlet port opens between the lower end of the upper fluid guide plate and the upper end of the lower fluid guide plate, a magnet is located inside the magnet drum so as to extend along the fluid channels and be fixed relatively to the magnet drum, the outer peripheral surface of the magnet drum includes a magnetic field region which faces the magnet and a nonmagnetic field region which does not face the magnet, and a ridge part which protrudes radially of the magnet drum from the outer peripheral surface of the magnet drum and rotates integrally with the magnet drum, the cylindrical outer peripheral surface of the magnet drum is configured to hold the magnetic objects in the magnetic field region when the ridge part is in the magnetic field region, and the ridge part is configured to force out the magnetic objects toward the nonmagnetic field region when the ridge part is moved in the nonmagnetic field region in a state where the magnet drum rotates.

2. A contaminated fluid recovery apparatus according to claim 1, wherein the filter drum member is a magnet drum, and the inlet port is directed away from the contaminated fluid supply port.

3. A contaminated fluid recovery apparatus according to claim 1 or 2, wherein an idler sprocket for transmitting the motion of the chain of the conveyor to the filter drum member, thereby rotating the drum member, is located between the chain and a driven section of the filter drum member.

4. A contaminated fluid recovery apparatus according to claim 1, further comprising a guard plate disposed opposite the lower inlet port in the dirty tank.

* * * * *